United States Patent [19]
Ota

[11] Patent Number: 5,347,272
[45] Date of Patent: Sep. 13, 1994

[54] SYSTEM FOR DETERMINING COMMUNICATION ROUTES IN A NETWORK

[75] Inventor: Hiromi Ota, Kanagawa, Japan

[73] Assignee: Fuji Xerox Co., Ltd., Tokyo, Japan

[21] Appl. No.: 943,567

[22] Filed: Sep. 11, 1992

[30] Foreign Application Priority Data

Sep. 13, 1991 [JP] Japan .................. 3-235060
Feb. 14, 1992 [JP] Japan .................. 4-028545

[51] Int. Cl.[5] .............................. H04B 3/38
[52] U.S. Cl. .................. 340/827; 340/826; 370/60
[58] Field of Search .......... 340/827, 826, 825.52; 370/94.1, 60, 85.13, 54, 79, 61

[56] References Cited

U.S. PATENT DOCUMENTS

| 4,748,660 | 5/1931 | Deveze | 340/826 |
| 4,947,390 | 8/1990 | Sheehy | 370/85.13 |
| 4,984,235 | 1/1991 | Hillis et al. | 370/60 |
| 4,984,264 | 1/1991 | Katsube | 370/54 |
| 4,987,536 | 1/1991 | Humblet | 370/60 |

FOREIGN PATENT DOCUMENTS 2-143746 6/1990 Japan .
2-143759 6/1990 Japan .

OTHER PUBLICATIONS

"Internet Transport Protocols", Xerox Corporation, Xerox System Integration Standard, Dec. 1981.

Primary Examiner—Douglas W. Olms
Assistant Examiner—Shick Hom
Attorney, Agent, or Firm—Finnegan, Henderson, Farabow, Garrett & Dunner

[57] ABSTRACT

A network system capable of speedily selecting an intermediate system which can provide a shortest route of data communication among various intermediate systems even if routing information is not stored on the end system side, and in which the wasteful routing information is not held on the end system side, thereby minimizing an amount of routing information stored. In the network system, each packet for broadcast communication sent from each intermediate system is imparted to an intermediate system-address extracting unit 6 via a reception unit 2 and a packet processing unit 4 in the end system. The management-address extracting unit 6 extracts addresses of the intermediate systems from the packets, and stores these addresses in the management-address storage unit 8. When the packet is transmitted from this end system, the packet processing unit 4 obtains addresses in the management-address storage unit 8 via a route request unit 9, and sends a request of routing information to the intermediate systems having these addresses via a transmission unit 10. When the respective routing information is sent from the intermediate systems to the end system in response to that request, a route selecting unit 5 determines a shortest route to the destination on the basis of each routing information. The packet processing unit 4 request the intermediate system providing the shortest route to relay the packet.

9 Claims, 8 Drawing Sheets

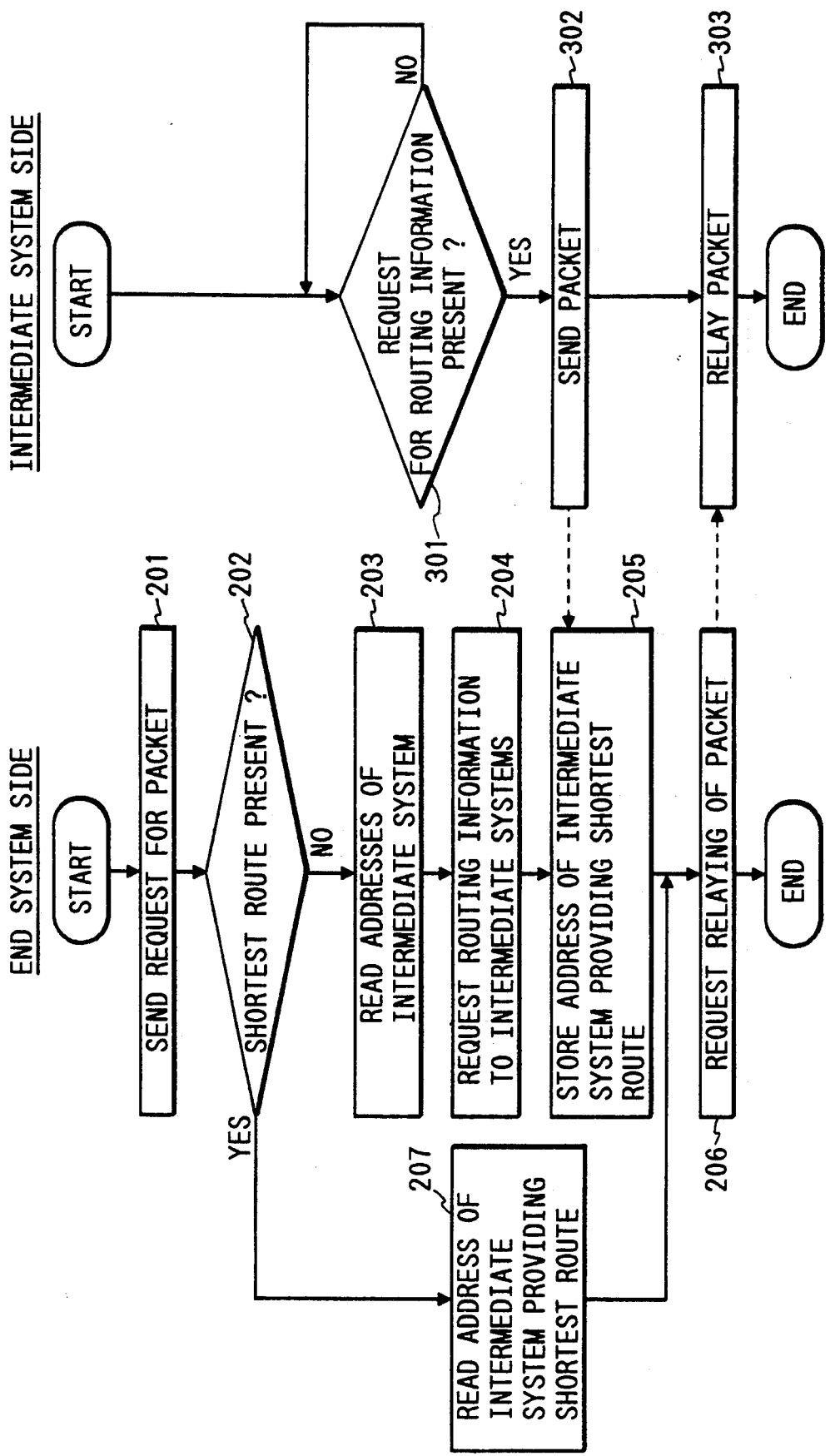

FIG. 7(a)

| NET | D |
|---|---|
| AGE | 0 |
| DELAY | 2 |
| LAST ACCESS | 12:00:00 |
| ROUTE | R12 |

FIG. 7(b)

| NET | D |
|---|---|
| AGE | 0 |
| DELAY | 2 |
| LAST ACCESS | 12:00:01 |
| ROUTE | R12 |

FIG. 7(c)

PRESENT TIME 12:08:35

| NET | D | B |
|---|---|---|
| AGE | 30 | 120 |
| DELAY | 2 | 2 |
| LAST ACCESS | 12:08:30 | 12:07:00 |
| ROUTE | R12 | R11 |

FIG. 7(d)

| NET | D | B |
|---|---|---|
| AGE | 60 | 0 |
| DELAY | 2 | 2 |
| LAST ACCESS | 12:09:55 | 12:10:00 |
| ROUTE | R12 | R11 |

FIG. 7(e)

PRESENT TIME 12:10:35

| NET | D |
|---|---|
| AGE | 180 |
| DELAY | 2 |
| LAST ACCESS | 12:10:30 |
| ROUTE | R12 |

FIG. 7(f)

| NET | D |
|---|---|
| AGE | 0 |
| DELAY | 3 |
| LAST ACCESS | 12:10:36 |
| ROUTE | R11 |

SYSTEM FOR DETERMINING COMMUNICATION ROUTES IN A NETWORK

BACKGROUND OF THE INVENTION

1. Field of the Invention

The present invention relates to a network system for data communication, and more particularly to update processing of routing information concerning the determination of communication routes in a network system.

2. Description of the Related Art

FIG. 8 shows a logical configuration of a conventional network system of this type. In the drawing, end systems (E11, E12, E21, ... ) are connected to a network A, a network B, and a network C, respectively. An intermediate system R11 is connected to the networks A and B, and data can be transferred between these networks via a shortest route. An intermediate system R12 is connected between the networks A and C, and data can be transferred between these networks via a shortest route.

Here, in a case where data is to be transmitted from the end system E11 to the end system E21, for instance, the end system E11 requests the intermediate system R11, which transfers data between the networks A and B via a shortest route, to effect routing, and the data is transmitted to the end system E21 via the intermediate system R11.

To transmit data via a shortest route in the above-described manner, each end system stores within itself shortest routes from the network, to which it is connected, to other networks. Each end system requests the routing of data to the intermediate system which selects a shortest route, as necessary, in correspondence with a destination end system and provides the shortest route selected. Such shortest routes between networks are determined by the intermediate systems, and are broadcast from the intermediate systems to the end systems as routing information. Each end system stores the routing information in a routing table. In addition, since the logical configuration of the network system changes with time, the routing information is updated one item after another, and is periodically broadcast. Accordingly, the end systems receive the routing information periodically, and stores and manages most up-to-date information, respectively.

If an end system is unable to receive the broadcast of the routing information for a certain period of time due to some reason or other, the information stored in the routing table which the end system possesses is not updated and, hence, becomes outdated. As a result, its value as information is lost. In addition, that end system will continue to possess this outdated information.

For that reason, a routing information update processing system has been proposed in which routing information which the end system possesses can be updated as the end system itself issues a request for updating the routing information (refer to Unexamined Japanese Patent Publication (Kokai) Hei-2-143759/(1990)).

However, according to the processing system of Unexamined Japanese Patent Publication Hei-2-143759/(1990), since all of the routing information is held, the amount of routing information becomes very large when the size of the network system is expanded or complicated. For this reason, there have been drawbacks in that it becomes difficult for the end system to secure a storage area for storing the routing information, and that the management cost becomes high.

In contrast, a routing information management processing system has been proposed in which necessary routes are extracted by the end system from the routing information sent from the intermediate system, and only the extracted routes are stored and managed (refer to Unexamined Japanese Patent Publication Hei-2-143746/(1990)). According to this processing system, since only the necessary routes extracted from the routing information are stored by the end system, it is possible to reduce the information storage area. Nevertheless, since the validity of the information which is held cannot be judged, the problem that the updated wasteful information is held remains unresolved.

In addition, in the above-described processing systems, the end system waits for periodical reception of routing information unless accurate routes are stored, so that there has been a drawback in that time is required until data is transmitted.

SUMMARY OF THE INVENTION

Accordingly, it is an object of the present invention to provide a network system capable of preventing end systems from holding wasteful information and of reducing an amount of routing information stored to a necessary minimums.

Another object of the present invention is to provide a network system capable of speedily selecting an intermediate system which can provide a shortest route for data communication from among various intermediate systems without needing to store routing information on the end system side.

A network system in accordance with the first aspect of the present invention basically comprises: a plurality of end systems connected to a network, and a plurality of intermediate systems which are each adapted to relay data to be transmitted to and from the end systems and to send to the network broadcast communication data which are broadcast to a plurality of addresses and in which an own address is set as a sender. Each of the end system includes an extracting unit, an address storage unit, a request unit, a selecting unit, a routing information storage unit, and first and second deletion units.

The extracting unit receives the broadcast communication sent from the intermediate systems and extracts addresses of the intermediate systems contained in these packets. The address storage unit stores the addresses of the intermediate systems. The request unit requests the intermediate systems to provide routing information, on the basis of the addresses of the intermediate systems stored in the address storage unit. The selecting unit selects routing information and an intermediate system to which the relaying of the data is to be requested among the intermediate systems. In addition, the routing information storage unit stores the routing information selected, information concerning the time when the routing information selected was acquired, and information concerning the time when the routing information selected was accessed by associating them with each other. Furthermore, the first deletion unit deletes information concerning the routing information which was not accessed for a predetermined period of time, by referring to the information concerning the time when the address of the routing information storage unit was accessed. The second deletion unit deletes information concerning the routing information for which a predetermined time has elapsed after acquisition, by referring to the information concerning the time when the address of the routing information storage unit was acquired.

In the network system according to the second aspect of the present invention, the addresses of the intermediate systems extracted by the extracting means are stored in the address storage unit, and when the data is sent to the network, a request for routing information is issued from the request unit to each intermediate system by referring to the addresses of the address storage unit. The selecting unit selects the routing information and the intermediate system to which the relaying of data is requested, on the basis of the routing information from the intermediate systems obtained as a result of the request. Then, the routing information selected at that time, the information concerning the time when that routing information was acquired, and the information concerning the time when that routing information was accessed are stored in the routing information storage unit. The first deletion unit manages the time when the routing information of the routing information storage unit was used, if the routing information stored is not utilized for a predetermined period of time, the first deletion unit deletes the information concerning the relevant routing information. Similarly, the second deletion unit manages the time when the routing information stored in the routing information storage unit was acquired, if a predetermined time has elapsed from the acquisition of the routing information stored, the second deletion unit deletes the information concerning the relevant routing information. According to the above-described arrangement, since the wasteful information which was not used frequently, or outdated information for which a certain period of time has elapsed, is automatically deleted. Hence, it is possible to minimize the amount of routing information stored in the end system.

In a network system according to the second aspect of the present invention, the end system includes an extracting unit, a storage unit, a request unit, and a selecting unit. When the extracting unit receives respective broadcast data sent from the intermediate systems, the extracting unit extracts the addresses of the senders, i.e., the addresses of the intermediate systems, from the broadcast communication data, and stores the addresses of the intermediate systems in the storage unit. When the data is sent to the network, the request unit request the intermediate systems to send the routing information, on the basis of the addresses of the intermediate systems in the storage unit. The selecting unit selects an intermediate system to which the relaying of the data is requested among the intermediate systems, on the basis of the respective routing information from the intermediate systems obtained as a result of the request to the intermediate systems by the request unit.

In the network system according to the second aspect of the present invention, the arrangement provided is such that the addresses of the intermediate systems extracted by the extracting unit are stored in the storage unit, and when the data is transmitted to the network, the request unit request the respective intermediate systems having addresses to send routing information, and the selecting unit selects the intermediate system to which the relaying of data is requested, on the basis of the respective routing information from the intermediate systems obtained as a result of the request. Accordingly, the end system only needs to manage the addresses of the intermediate systems by storing the same, so that the storage area required for this purpose can be clearly smaller than the area for storing the routing information. In addition, since a request is made from the end system to the intermediate systems to send routing information, it is possible to speedily obtain the respective routing information from the intermediate systems. Hence, less time is required until the transmission of data.

BRIEF DESCRIPTION OF THE DRAWINGS

FIG. 4B is a flowchart illustrating the relay processing of a packet which is effected by the end system shown in FIG. 1 and an intermediate system;

FIGS. 7($a$) to 7($f$) are diagrams illustrating the conditions of a routing table.

DESCRIPTION OF THE PREFERRED EMBODIMENTS

Referring now to the accompanying drawings, a detailed description will be given of an embodiment of a network system in accordance with the present invention.

Figures 2, 3:
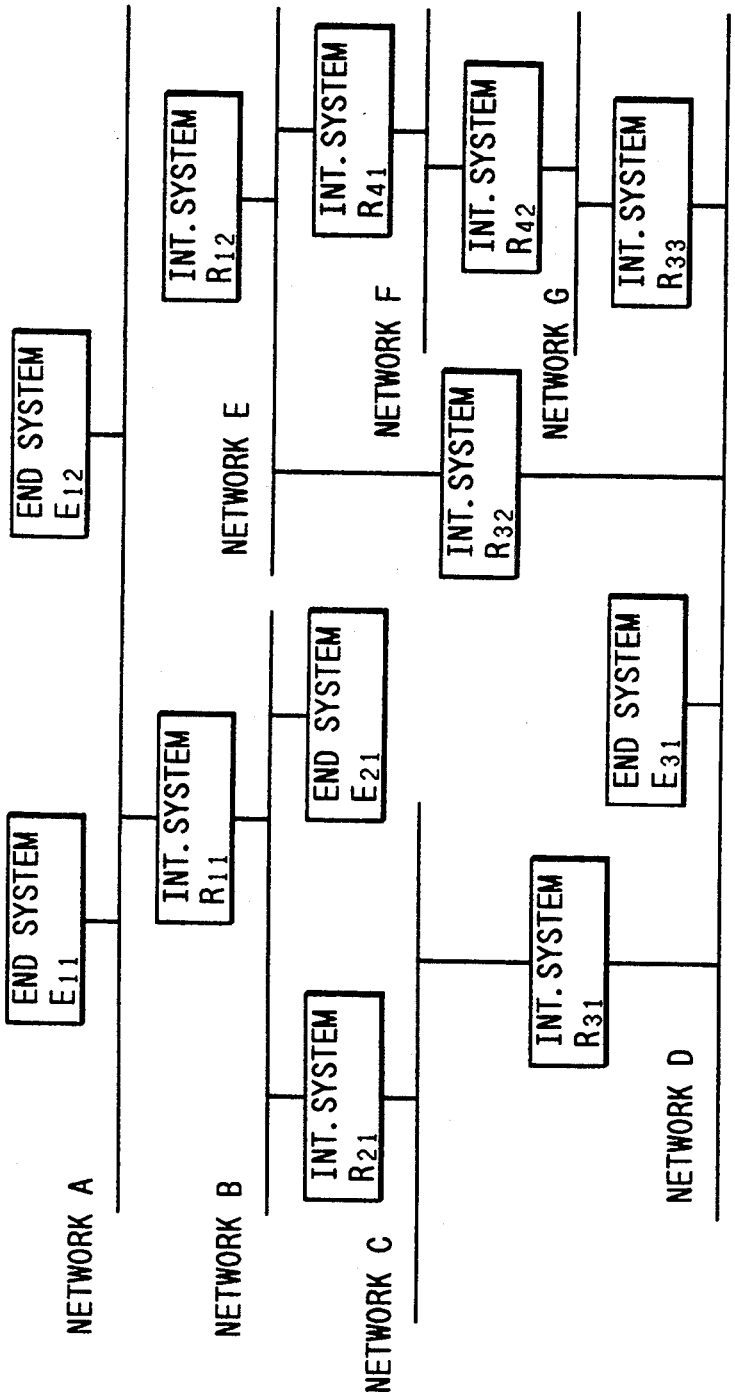
FIG. 2 is a diagram illustrating a logical configuration of the network system in accordance with the present invention.
FIG. 3 is a diagram illustrating a routing table used in the end system of an embodiment.

FIG. 2 shows a logical configuration of a network system in accordance with the present invention. In the drawing, intermediate systems (R11, R12, R21, . . . ) for managing routing information and end systems (E11, E12, E21, . . .) for effecting communication on the basis of the routing information supplied by these intermediate systems to the network are located on networks A to G. The plurality of networks are connected to each other by means of intermediate systems Rxx.

Figure 1:
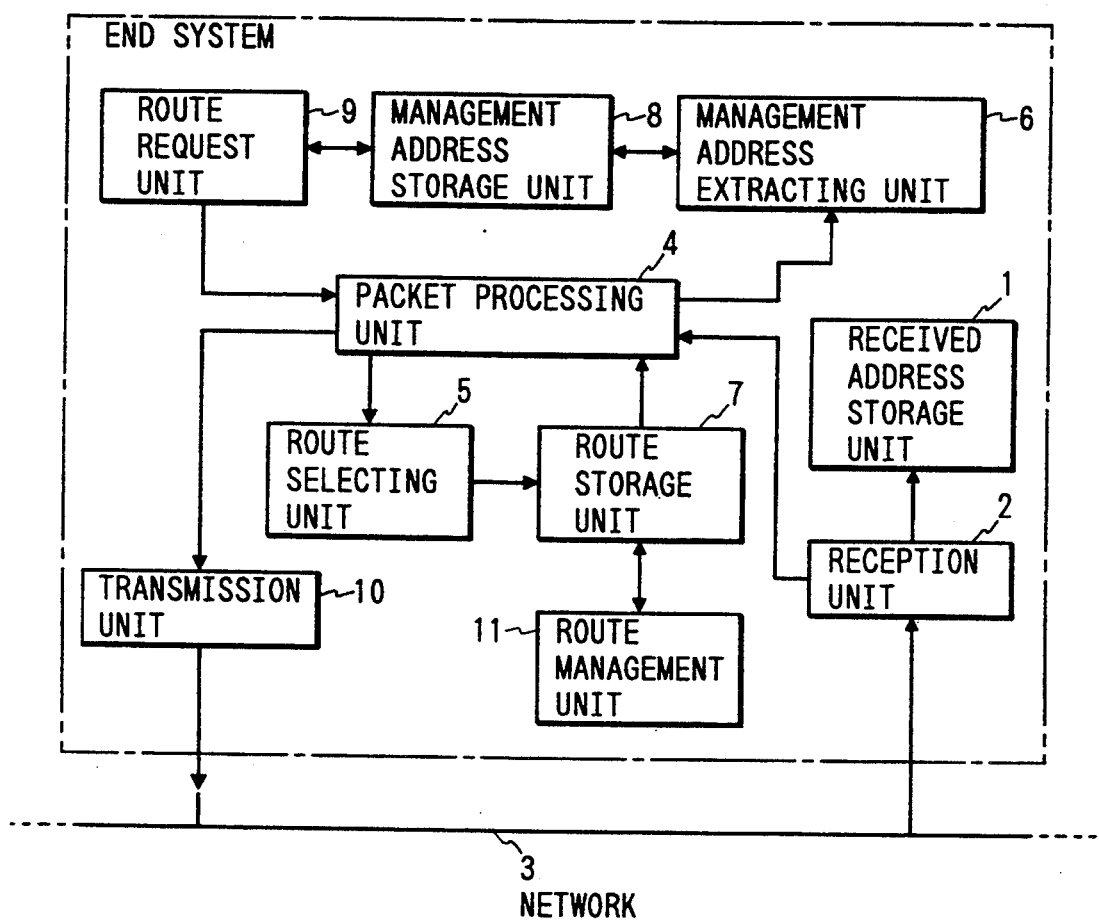
FIG. 1 is a block diagram illustrating a basic configuration of an end system used in a network system in accordance with the present invention.

FIG. 1 is a block diagram illustrating a basic configuration of an end system used in the above-described network system. It should be noted that the end system of this embodiment is applicable to any of the end systems E11, E12, E21, . . . in the network system shown in FIG. 2.

A received-address storage unit 1 stores an address indicating this end system and an address indicating a broadcast.

A reception unit 2 is connected to a network 3, and is used for fetching a packet on the network 3 thereto. Upon fetching the packet, the reception unit 2 collates a destination address contained in the packet with each address in the received-address storage unit 1. Here, if this destination address coincides with any one of the destination addresses in the received-address storage unit 1, this packet is addressed to the relevant end system, the reception unit 2 delivers this packet to a packet processing unit 4. On the other hand, if the destination address contained in the packet coincides with none of the addresses in the received-address storage unit 1, it means that this packet is not addressed to the relevant end system, so that the reception unit 2 discards the packet.

The packet processing unit 4 is designed to process a given packet, and if a packet whose destination address is an address indicating the relevant end system contains routing information, the packet processing unit 4 delivers that packet to a route selecting unit 5. In addition, the packet which contains an address indicating a broadcast as a destination address also contains routing information, the packet processing unit 4 delivers that packet to a management-address extracting unit 6. In either case, if the packet does not contain routing information, the packet processing unit 4 performs predetermined processing with respect to that packet.

Upon receiving from the packet processing unit 4 the packet which contains an address indicating the relevant end system as a destination address and which also contains routing information, the route selecting unit 5 selects one routing from the routing information, and stores the same in a route storage unit 7. The route storage unit 7 stores the routing information received from the route selecting unit 5 by associating the same with information concerning the time when the routing information was acquired and information concerning the time when the routing information was accessed. A routing table used in the end system of this embodiment is shown in FIG. 3. FIG. 3 shows items which are set in the routing table as well as their contents. The route storage unit 7 has such routing tables in a number corresponding to the number of networks where the other end systems with which the relevant end system has communicated are located.

A route management unit 11 performs processing for managing information contained in the routing tables stored in the route storage unit 7. That is, when a request for sending data to the network 3 is generated, the route management unit 11 retrieves the addresses of the intermediate systems stored in the route storage unit 7, and requests each intermediate system to provide routing information on the basis of those addresses. At the same time, the route management unit 11 effects processing for rewriting the routing tables on the basis of the routing information received, as well as processing for deleting information concerning routing information which was not accessed for a predetermined period of time, by referring to the information concerning the time when the routing information of the route storage unit 7 was accessed, and processing for deleting information concerning the routing information for which a predetermined period of time has elapsed after its acquisition, by referring to the information concerning the time when the routing information of the route storage unit 7 was acquired.

Upon receiving from the packet processing unit 4 the packet which contains an address indicating a broadcast as the destination address and which also contains routing information, the management-address extracting unit 6 extracts a sender's address contained in that packet, i.e., the address of an intermediate system, and stores the address of this intermediate system in a management-address storage unit 8.

When an instruction for retrieval of the address of an intermediate system is given from the packet processing unit 4, a route request unit 9 retrieves the address in the management-address storage unit 8 in response to the instruction, and returns that address to the packet processing unit 4.

A transmission unit 10 receives from the packet processing unit 4 a packet to be transmitted, and transmits that packet to the network 3.

Figure 4A:
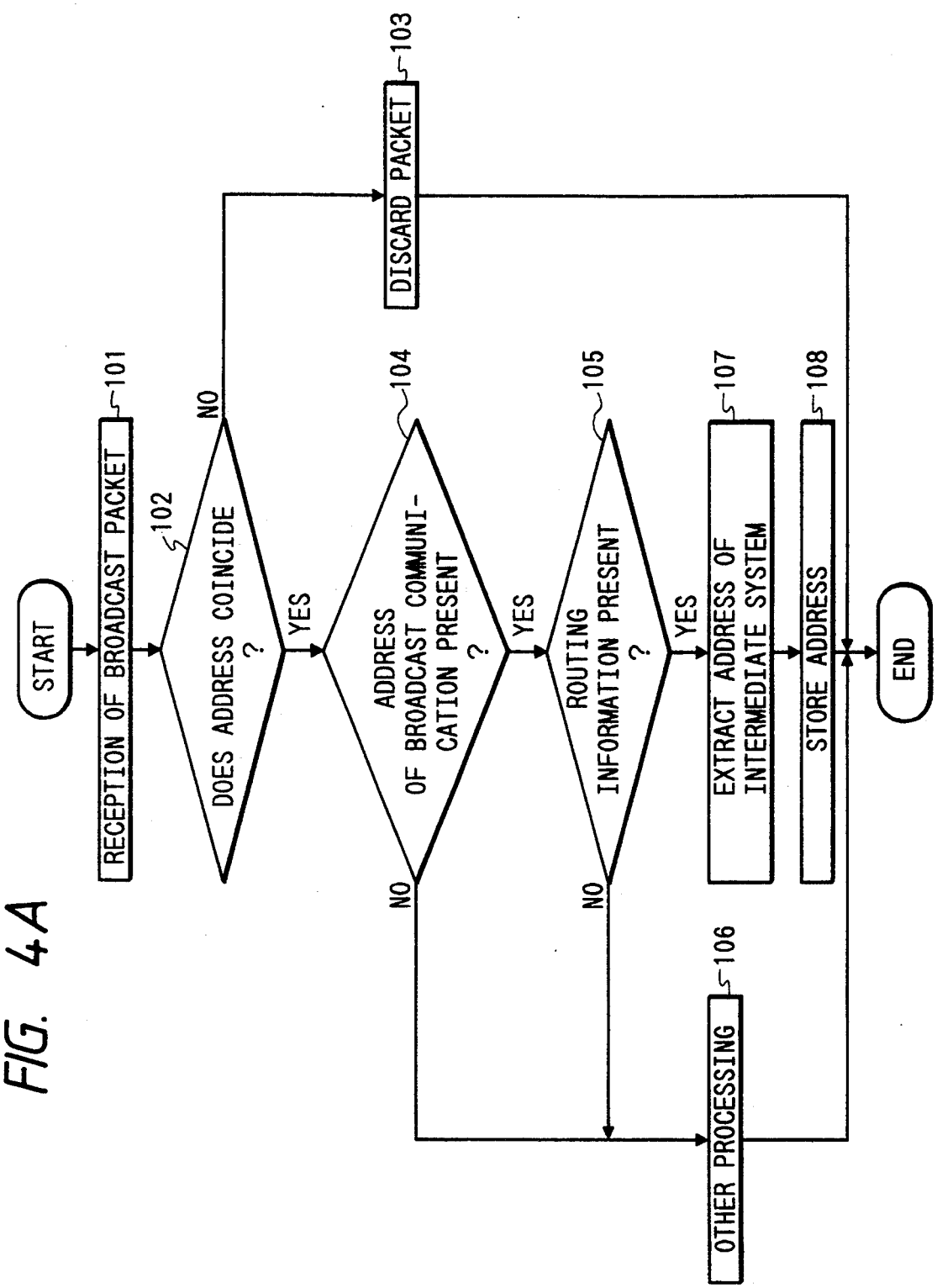
FIG. 4A is a flowchart illustrating the reception processing of a broadcast packet which is effected in the end system shown in FIG. 1.

In an end system of the above-described arrangement, if it is assumed that, for instance, the device is an end system E11 shogun in FIG. 2, processing shown in the flowcharts of FIGS. 4A and 4B is performed each time the packet containing routing information is periodically transmitted from each intermediate system R11, R12 to the network A. It should be noted that the packet which is transmitted periodically is broadcast to all the end systems connected to the network A, and contains an address indicating a broadcast as its destination address, and this packet will be referred to as the broadcast packet in the description that follows.

First, if it is assumed that the broadcast packet is transmitted from the intermediate system R11 to the network A, the reception unit 2 in the end system E11 fetches the broadcast packet from the network A (Step 101), and determines whether the destination address contained in this broadcast packet coincides with any one of the addresses in the received-address storage unit 1 (Step 102). Here, since the address indicating a broadcast is contained in the broadcast packet as the destination address, a determination is made that it coincides (Step 102, YES), and this broadcast packet is delivered to the packet processing unit 4. If the destination address contained in the packet coincides with none of the addresses in the received-address storage unit 1 (Step 102, NO), this packet is discarded (Step 103), and this routine ends.

Upon reception of the broadcast packet, the packet processing unit 4 confirms whether the broadcast address is contained (Step 104, YES), and confirms whether routing information is contained (Step 105, YES), whereupon the packet processing unit 4 imparts that broadcast packet to the management-address extracting unit 6. It should be noted that if the broadcast address is not contained (Step 104, NO), or routing information is not contained (Step 105, NO), other processing is performed with respect to this packet (Step 106).

Upon reception of the broadcast packet, the management-address extracting unit 6 extracts the address of the intermediate system R11 contained in that packet as the sender's address (Step 107), and stores this address in the management-address storage unit 8 (Step 108).

It should be noted that in a case where the broadcast packet is transmitted from the intermediate system R12 to the network A, similar processing is conducted, whereby the address of the intermediate system R12 is stored in the management-address storage unit 8.

When the broadcast packet from the intermediate system is thus received, the routing information contained in that packet is not retained at all, and only the address of the intermediate system contained in that packet is stored in the management-address storage unit 8.

The intermediate system indicated by the address stored in the management-address storage unit 8 in the above-described manner is capable of relaying a packet from the end system E11 connected to the network A to an end system connected to another network. Namely, the intermediate systems capable of relaying the packet from the end system E11 to an end system connected to another network are the intermediate systems R11, R12, and the addresses of these intermediate systems R11, R12 are stored in the management-address storage unit 8.

It should be noted that the logical configuration of the network system shown in FIG. 2 changes on occasion, so that the intermediate systems capable of relaying the packet from the end system E11 connected to the network A to the end systems connected to other networks also change. Hence, an arrangement is provided such that after the lapse of a fixed period of time, which is a transmission period of a broadcast packet, from the time when the address is stored in the management-address storage unit 8, that address is deleted from the management-address storage unit 8. As a result, the addresses of the intermediate systems which are no longer capable of relaying the packet due to a change in the logical configuration of the network system are prevented from being stored in the management-address storage unit 8. Hence, only the addresses of the intermediate systems capable of relaying the packet are stored therein.

Referring now to the flowchart shown in FIG. 4B, a description will be given of a processing procedure at a time when the packet is transmitted from the end system E11 connected to the network A to an end system connected to another network. It should be noted that the destination end system is an end system E21 connected to the network B.

First, when a request for sending a packet to the other end system E21 is generated (Step 201), the packet processing unit 4 in the end system E11 determines whether or not the address of the intermediate system providing a shortest route to the destination end system E21 has already been stored in the route storage unit 7 (Step 202). Here, since the address of the intermediate system providing the shortest route to the destination end system E21 has not been stored in the route storage unit 7 (Step 202, NO), the packet processing unit 4 instructs a request for address retrieval to the route request unit 9. In response to this request, the route request unit 9 reads the addresses of the intermediate systems R11, R12 from the management-address storage unit 8, and returns these addresses to the packet processing unit 4 (Step 203).

The packet processing unit 4 forms a packet containing the addresses of the intermediate systems R11, R12 and requesting routing information, and transmits this packet to the network A via the transmission unit 10 (Step 204).

Upon receiving the packet sent from the end system E11 to the network A (Step 301, YES), the intermediate systems R11, R12 confirm that the address of the respective intermediate system is contained in the packet as the destination address. Then, to respond to the request for routing information by means of this packet, each of the intermediate systems R22, R12 extracts the sender's address contained in the packet, i.e., the address of the end system E11, forms a packet containing the address of this end system E11 as the destination address and containing routing information, and transmits this packet to the network A (Step 302). It should be noted that each of the packets transmitted from each of the intermediate systems R11, R12 to the network A contains the routing information, but does not contain an address indicating a broadcast, so that it is not a broadcast packet.

The reception unit 2 in the end system E11 consecutively fetches the packets from the intermediate systems R11, R12, and confirms that the destination address contained in each packet, i.e., the address of the relevant end system, coincides with any one of the addresses in the received-address storage unit 1. Then, the reception unit 2 consecutively delivers these packets to the packet processing unit 4.

Since each of the packets contains the address indicating the relevant end system as the destination address and also contains the routing information, the packet processing unit 4 delivers these packets to the route selecting unit 5. On the basis of the routing information contained in each packet, the route selecting unit 5 determines a shortest route to the network B to which the destination end system E21 is connected, and extracts the sender's address from the packet containing the routing information indicating this shortest route. Here, since the intermediate system capable of providing the shortest route to the network B to which the destination end system E21 is connected is the intermediate system R11, the packet containing the routing information indicating the shortest route is the packet from the intermediate system R11, so that the sender's address contained in that packet is the address of the intermediate system R11.

The route selecting unit 5 stores in the route storage unit 7 the address of the intermediate system R11 as the address of the intermediate system providing the shortest route to the destination end system E21 (Step 205), and returns this address to the packet processing unit 4.

Upon reception of the address of the intermediate system R11, the packet processing unit 4 forms a packet containing the address of this intermediate system R11 and addressed to the end system E21 in the network B, and transmits this packet to the network A via the transmission unit 10 (Step 206).

Since this packet contains the address of the intermediate system R11, this packet is received by the intermediate system R11. The intermediate system R11 transmits the packet to the network B via the shortest route (Step 303). Upon confirming that the address of the relevant end system is contained as the destination address, the end system E21 fetches this packet.

It should be noted that in a case where the packet addressed to the end system E21 is retransmitted, processing in the aforementioned Step 201 and onwards is perforated again. However, since a determination is made in the aforementioned Step 202 that the address of the intermediate system R11 is already stored in the route storage unit 7 as the address of the intermediate system providing the shortest route to the destination end system E21, the aforementioned Steps 203–205 are omitted, and Step 207 is effected instead. In this Step 207, the packet processing unit 4 reads the address of the intermediate system R11 from the route storage unit 7, and forms a packet containing the address of this intermediate system R11 and addressed to the end system E21 in the network B. Then, this packet is transmitted to the network A via the transmission unit 10 (Step 206).

In this case, since the logical configuration of the network system changes on occasion, there may be a case where the intermediate system R11 no longer provides the shortest route. In such a case, since the end system E11 is notified to that effect by the intermediate system R11, it suffices if the address of the intermediate system R11 in the route storage unit 7 is deleted in response to the same.

Thus, the arrangement provided is such that the addresses of the intermediate systems capable of relaying the packet are stored in the management-address storage unit 8, and when the packet is transmitted, a request for routing information is made to the respective intermediate systems, a shortest route is determined on the basis of the routing information obtained therefrom, and the intermediate system capable of providing this shortest route is requested to effect the relaying. That is, when the packet is transmitted, since the periodical reception of the broadcast packets is not waited for, and the routing information is acquired without delay through requests to the intermediate systems, the packets can be transmitted speedily. In addition, since the addresses of the intermediate systems capable of relaying the packets are stored instead of the routing information, a storage area for this purpose can be made small.

Next, a description will be given of another embodiment with reference to the flowchart shown in FIG. 5.

Figure 5:
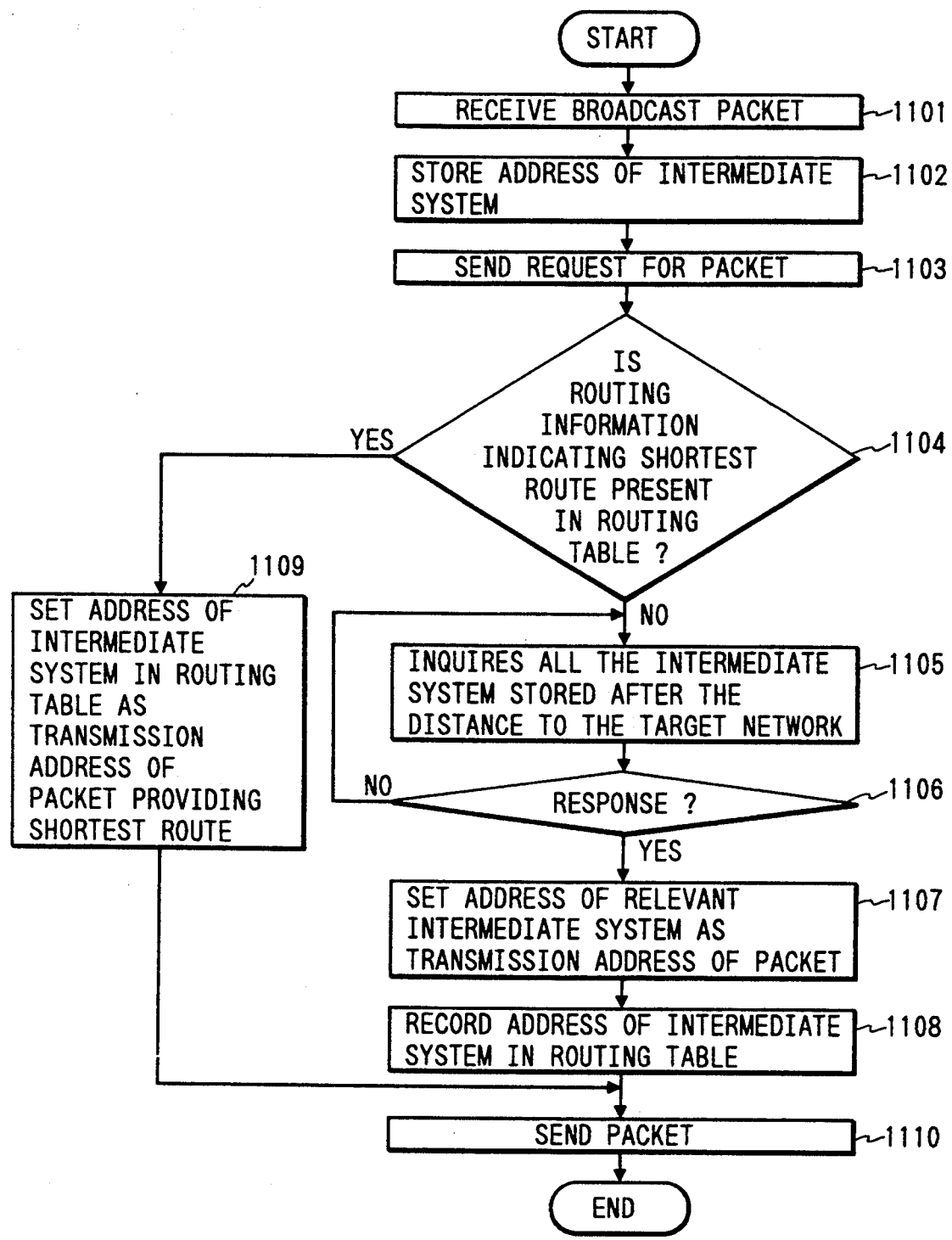
FIG. 5 is a flowchart illustrating processing in a case where the reception of a broadcast packet and the transmission of the packet are effected.

In FIG. 5, if it is assumed that the broadcast packet is transmitted from the intermediate system R11 to the network A, the reception unit 2 in the end system E11 receives the broadcast packet containing the routing information (Step 1101), and determines whether or not the destination address contained in the broadcast packet coincides with any one of the addresses in the received-address storage unit 1. Here, since the address indicating a broadcast is contained in the broadcast packet as the destination address, this broadcast packet is delivered to the packet processing unit 4. Upon reception of the broadcast packet, the packet processing unit 4 confirms that the broadcast address is contained therein, and that the routing information is also contained. Then, the packet processing unit 4 delivers this broadcast packet to the management-address extracting unit 6. Upon reception of the broadcast packet, the management-address extracting unit 6 extracts the address of the intermediate system R11 contained as the transmission address of this packet, and stores the same in the management-address storage unit 8.

Also, in a case where the broadcast packet is transmitted from the intermediate system R12 to the network A, similar processing is conducted, whereby the address of the intermediate system R12 is stored in the management-address storage unit 8.

At this stage, a description will be given of an example in which the packet is transmitted for the first time from the aforementioned end system E11 to an end system E31 on the network D. When a request of transmission of a packet from the end system E11 to the end system E31 on the network D is generated (Step 1103), the route management unit 11 searches an entry (the address of an intermediate system to be transmitted) of routing to the network D in the end system E11 in the routing table in the route storage unit 7, and the route management unit 11 determines whether there is routing information indicating a shortest route (Step 1104). Here, since there is no entry in the routing table, the route request unit 9 reads the addresses of the intermediate systems R11, R12 from the management-address storage unit 8, and delivers the same to the packet processing unit 4. The packet processing unit 4 sends a packet for inquiring the distance to the network D to the intermediate systems R11, R12 via the transmission unit 10 (Step 1105), and waits for responses from the intermediate systems (Step 1106). Then, the route selecting unit 5 selects the intermediate system R12 providing the shortest route in which the distance to the target network D is the smallest. The packet processing unit 4 sets the address of the intermediate system R12 selected as the transmission address of the packet to be transmitted (Step 1107). Subsequently, the route management unit 11 records the address of the intermediate system R12 and the routing information in the routing table of the route storage unit 7 (Step 1108), and transmits the packet to the intermediate system R12 via the transmission unit 10 (Step 1110).

Meanwhile, if the routing information indicating the shortest route is found in the routing table in Step 104, the address of the intermediate system providing the shortest route in the routing table is set as the transmission address of the packet to be transmitted (Step 1109). Then, the packet is transmitted to the intermediate system R12 from the transmission unit 10 (Step 1110).

Thus, the periodical reception of the broadcast packets is not merely waited for, but when the packet is transmitted, the routing information indicating the shortest route is acquired without delay through requests to the intermediate systems, so that the packets can be transmitted speedily.

Figure 6:
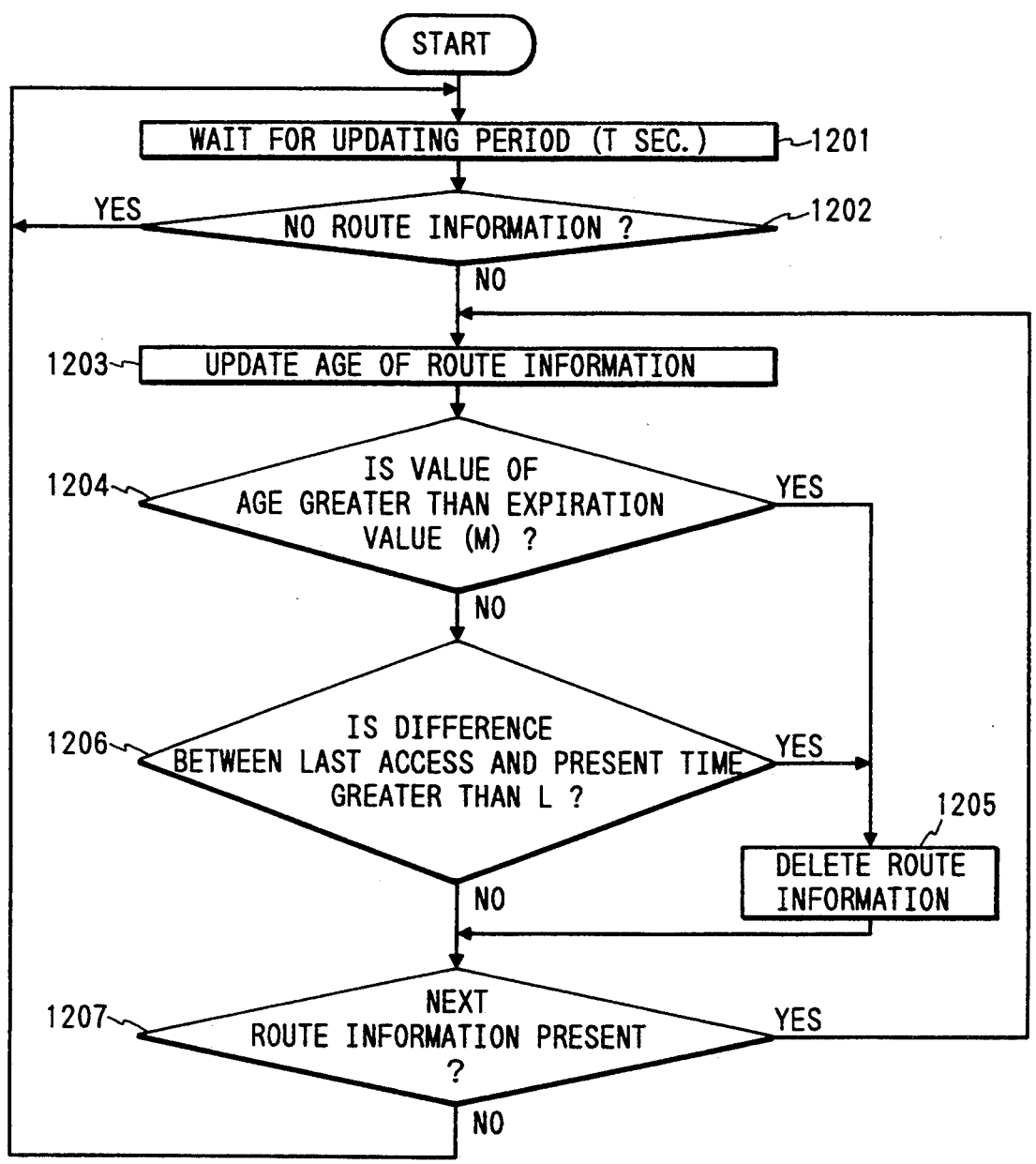
FIG. 6 is a flowchart illustrating a processing procedure when routing information is updated.
Figure 8:
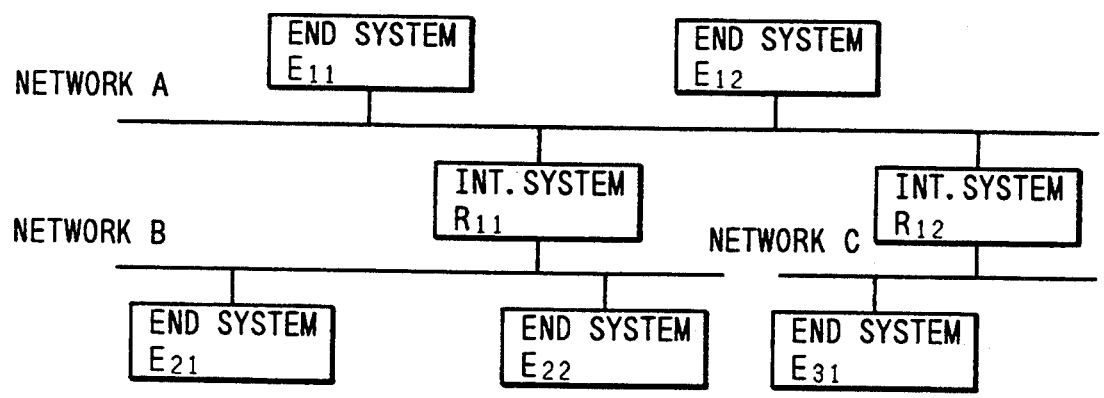
FIG. 8 is a diagram illustrating a logical configuration of a conventional network system of this type.

Referring now to the flowchart shown in FIG. 6, a description will be given of a processing procedure at a time when the routing information stored in the routing table is updated by the route management unit 11.

First, a description will be given of each timer set in the route management unit 11.

Routine Information Updating Period (T): The accuracy of the routing information is maintained by checking the routine table by this fixed period (T).

Routing Information Expiration Value (M): The routing information which has exceeded the routine information expiration value (M) is information concerning which a certain time duration has elapsed even though that routing information might have been utilized quite frequently. Hence, since there is the possibility that the state of the network has changed, it is necessary to inquire the intermediate systems newly.

Maximum Interval (L) Between Accesses to Routing Information: Since it is unnecessary to store the routing information which is not accessed frequently, an interval value for determining the frequency of access to the routing information is determined in advance.

First, the route management unit 11 registers the routing information provided from the intermediate system R12 as an entry of the routing to the network D, and records the present time as the Last Access value. The condition of the routing table at this time is shown in FIG. 7(a). Here, 12:00:00 is recorded as the Last Access value. The route management unit 11 sets an update timer (T) when the entry of the routing has been made. In FIG. 6, after the route management unit 11 waits for the updating period (T second) (Step 1201), the route management unit 11 determines whether there is routing information in the routing table (Step 1202). Here, if there is the routing information, the age of the information is updated (Step 1203). For instance, if T=30 sec., 30 seconds is added to the age. Then, a comparison is made between the value of age and the expiration value (M) (Step 1204), and if the value of age is greater than the expiration value (M), that routing information is deleted (Step 1205). On the other hand, if the value of age is not greater than the expiration value (M), a comparison is made between the Last Access value and the present time (Step 1206), and if the difference between the Last Access value and the present time is greater than (L), the operation proceeds to Step 1205 to delete that routing information. If NO is the answer in Steps 1204 and 1206, a determination is made as to whether or not there is ensuing routing information (Step 1207). Here, if the routing information remains, the operation returns to Step 1203, and if it does not, the operation returns to Step 1201.

Now, if an attempt is made to transmit a packet to the end system E31 several minutes after the end system E11 transmitted a packet to the end system E31, since the entry of the routing to the network D is present in the route storage unit 7, transmission is effected by making use of this information, and the present time is recorded as the Last Access value. The condition of the routing table at this time is shown in FIG. 7(b).

Here, if it is assumed that the updating period (T)=30 sec., the expiration value (M)=180 sec., and the maximum interval (L)=90 sec., and if packets are continually transmitted from the end system E11 to the end system E31 in the network D, and only one packet is transmitted to the end system E21 of the network B, the condition of the routing table becomes such as the one shown in FIG. 7(c). Here, the updating of the routing information is performed in accordance with the flow shown in FIG. 6 described earlier. That is, although the value of the age of the routing information of the network B is not more than M (180 sec.), since the Last Access value is not less than L (90 sec.), the routing information of the network B is deleted. As a result, the unnecessary data which is not used is deleted.

Furthermore, when the end system E11 retransmits the packet to the end system E21 several minutes afterwards, it is possible to acquire the latest information through the flow of FIG. 5 described earlier. The condition of the routing table at the time when the latest information is acquired is shown in FIG. 7(d).

In addition, if it is assumed that the updating period (T)=30 sec., the expiration value (M)=180 sec., and the maximum interval (L)=90 sec., and if the activity of an intermediate system R32 shown in FIG. 2 is stopped and the end system E11 continually transmits packets to the end system E31, the condition of the routing table becomes such as the one shown in FIG. 7(e). Here, since the value of the age of the routing information of the network D is not less than M (180 sec.) by means of the flow shown in FIG. 6 described earlier, that routing information is deleted from the routing table.

Furthermore, when the end system E11 transmits a packet to the end system E31 several seconds afterwards, since the entry of the routing to the network D is not present, it is possible to acquire the latest information through the flow shown in FIG. 5. The condition of the routing table at the time when the latest information is acquired is shown in FIG. 7(f). According to this arrangement, it is possible to obtain the routing information reflecting changes in the configuration of the network.

Although in the above-described embodiment the age of the routing table may not be started with 0, but may be started with the expiration value (M), and may be subtracted on each occasion of the updating period.

As for the routing protocols and broadcasts in the foregoing embodiments, it is possible to use known techniques described in the "Internet Transport Protocols" and the like.

As described above, in accordance with the present invention, the arrangement provided is such that the addresses of the intermediate systems are stored in advance, and when the data is sent to the network, the intermediate systems having these addresses are requested to send routing information, and the intermediate system to which the relaying of data is requested is selected on the basis of the respective routing information from the intermediate systems obtained as a result of the request. Therefore, it is unnecessary to store the routing information, and only the addresses of the intermediate systems are stored instead, so that the storage area required can be made small. In addition, it is possible to speedily obtain the respective routing information from the intermediate systems, thereby preventing the wait time until data transmission from becoming prolonged.

In addition, in the network system in accordance with this invention, the arrangement provided is such that when the routing information is stored, the time when the routing information was used and the time when it was acquired are recorded, and the information for which a fixed time duration has elapsed after acquisition of the relevant routing information and the information for which a fixed time duration has elapsed from the final access are deleted from the routing table. Therefore, outdated information and wasteful information are not retained, so that it is possible to keep the amount of routing information stored to a necessary minimum.

What is claimed is:

1. A network system comprising: a network, a plurality of end systems connected to said network, said end systems acting only as sources and destinations of data to be transmitted and received; and a plurality of intermediate systems for relaying said data to be transmitted and received to and from said plurality of end systems;

wherein at least one of said plurality of intermediate systems includes:

broadcast communication means for transmitting broadcast communication data, in which an address of said at least one of said plurality of intermediate systems is set as a sender, to said plurality of end systems connected to said network to which said at least one of said plurality of intermediate systems is connected as well as to at least one other of said plurality of said intermediate systems;

preparing means for preparing routing information on the basis of the broadcast communication data transmitted by said at least one other of said plurality of intermediate systems;

first routing information storage means for storing the routing information prepared by said preparing means; and returning means for returning the routing information to at least one of said plurality of end systems upon request of said at least one of said plurality of end systems, and wherein said at least one said plurality of said end systems includes:

extracting means which, upon receiving respective broadcast communication data transmitted from said at least one of said plurality of intermediate systems, is adapted to extract an address of said at least one of said plurality of intermediate systems respectively contained in the broadcast communication data;

storage means for storing the address extracted by said extracting means;

request means for requesting routing information from said at least one of plurality of intermediate systems on the basis of the address of said at least one of said plurality of intermediate systems in said storage means when the data is transmitted to said network; and selecting means for selecting a selected one of said plurality of intermediate systems from which the relaying of data is requested, on the basis of the respective routing information from said plurality of intermediate systems obtained as a result of the request by said request means.

2. A network system according to claim 1, wherein said at least one of said plurality of end systems further includes:

second routing information storage means for accumulating and storing the routing information from said selected one of said plurality of intermediate systems selected by selecting means; and retrieval means for retrieving the routing information stored in said second routing information storage means, wherein at the time of transmission of data to said network, said retrieval means effects retrieval prior to the request from said request means so as to determine whether or not routing information indicating a shortest route has been stored in said second routing information storage means, and if the information indicating the shortest route is present, said selecting means selects said selected one of said plurality of intermediate systems to which the relaying of data is requested, on the basis of the routing information indicating the shortest route retrieved by said retrieval means.

3. A network system according to claim 2, wherein at least one of said plurality of end systems further includes first deletion means for deleting the routing information stored in said second routing information storage means, on the basis of a time when the routing information stored in said second routing information storage means was accessed.

4. A network system according to claim 2, wherein at least one of said plurality of end systems further includes second deletion means for deleting the routing information stored in said second routing information storage means, on the basis of a time when the routing information stored in said second routing information storage means was stored.

5. An intermediate system which is connected to a network system including a network and a plurality of end systems, and is adapted to relay transmission and reception of data between said plurality of end systems, said intermediate system comprising:

broadcast communication means for transmitting broadcast communication data, in which an own address is set as a sender, to said plurality of end systems;

preparing means for preparing routing information on the basis of the broadcast communication data transmitted by a second intermediate system;

first routing information storage means for storing the routing information; and returning means for returning the routing information stored in said first routing information storage means to at least one of said plurality of end systems upon request of said at least one of said plurality of end systems.

6. An end system which is connected to a network system including a network and a plurality of intermediate systems each of said plurality of intermediate systems adapted to relay transmission and reception of data transmitted through the network and to transmit broadcast communication data which are broadcast to a plurality of addresses and in which an own address is set as a sender, so as to effect said transmission and reception of data, said end system comprising:

extracting means which, upon receiving respective broadcast communication data transmitted from said plurality of intermediate systems, is adapted to extract addresses of said plurality of intermediate systems respectively contained in the broadcast communication data;

storage means for storing the addresses extracted by said extracting means;

request means for requesting routing information from said plurality of intermediate systems on the basis of the addresses stored in said storage means when the data is transmitted to said network; and selecting means for selecting a selected one of said plurality of intermediate systems from which the relaying of data is requested, on the basis of the respective routing information from said plurality of intermediate systems obtained as a result of the request by said request means.

7. An end system of a network system according to claim 6, further including:

second routing information storage means for accumulating and storing the routing information of said selected one of said plurality of intermediate systems selected by selecting means; and retrieval means for retrieving the routing information stored in said second routing information storage means, wherein at the time of transmission of data to said network, said retrieval means effects retrieval prior to the request from said request means so as to determine whether routing information indicating a shortest route has been stored in said second routing information storage means, and if the information indicating the shortest route is stored, said selecting means selects said selected one of said plurality of intermediate systems from which the relaying of data is requested, on the basis of the routing information indicating the shortest route retrieved by said retrieval means.

8. An end system of a network system according to claim 7, further including:

first deletion means for deleting the routing information on the basis of a time when the routing information stored in said second routing information storage means was accessed.

9. An end system of a network system according to claim 7, further including:

second deletion means for deleting the routing information on the basis of a time when the routing information stored in said second routing information storage means was stored.

* * * * *